United States Patent

[19]

Sanada et al.

[11] Patent Number: 5,886,094
[45] Date of Patent: Mar. 23, 1999

[54] THERMOPLASTIC RESIN COMPOSITION

[75] Inventors: Takashi Sanada; Mitsuyoshi Shimano, both of Chiba, Japan

[73] Assignee: Sumitomo Chemical Company, Ltd., Osaka, Japan

[21] Appl. No.: 826,364

[22] Filed: Apr. 9, 1997

[51] Int. Cl.$^6$ .............................. C08L 77/00; C08L 71/00
[52] U.S. Cl. ................................ 525/66; 525/68; 525/71; 525/74; 525/77; 525/78; 525/80; 524/449; 524/504; 524/505; 524/514; 524/522; 524/517; 524/575; 524/275
[58] Field of Search .................................. 525/66, 71, 68; 524/449, 504, 505, 514, 522, 517, 571, 575, 275, 278, 279

[56] References Cited

U.S. PATENT DOCUMENTS 4,873,276  10/1989  Fujii et al. .............................. 524/153

FOREIGN PATENT DOCUMENTS

| 0 236 596 A1 | 9/1987 | European Pat. Off. . |
| 236596 | 9/1987 | European Pat. Off. . |
| 4-198354 | 7/1992 | Japan . |
| 7-173382 | 7/1995 | Japan . |
| 7-179747 | 7/1995 | Japan . |
| 7-179747 | 7/1996 | Japan . |

*Primary Examiner*—Mark L. Warzel
*Attorney, Agent, or Firm*—Pillsbury Madison & Sutro, LLP

[57] ABSTRACT

There is provided a thermoplastic resin composition which has damping property, mechanical strength, impact resistance and heat stability resistance in well-balance proportion and has excellent workability, and the composition comprising the following components (A) to (E), in which the ratio by weight of (A)/(B) is from 1/99 to 80/20, the content of the component (C) is from 1 to 50 parts by weight based on 100 parts by weight of the total amount of the components (A) and (B), the content of the component (D) is sufficient amount to compatibilize the components (A) and (B), and the content of the component (E) is from 1 to 120 parts by weight based on 100 parts by weight of the total amount of the components (A) and (B):

(A): polyphenylene ether,
(B): polyamide,
(C): conjugated diene-alkenyl aromatic compound copolymer in which not less than 50% of the conjugated diene compound is polymerized by 1,2-bond or 3,4-bond and the tan δ peak temperature thereof is not less than −20° C.,
(D): compatibilizing agent, and
(E): inorganic filler.

12 Claims, No Drawings

THERMOPLASTIC RESIN COMPOSITION

FIELD OF THE INVENTION

The present invention relates to a thermoplastic resin composition. More particularly, the present invention relates to a thermoplastic resin composition comprising a polyphenylene ether and polyamide as a main component and having improved damping property.

PRIOR ART

A polyamide resin is a thermoplastic resin having excellent mechanical property, solvent resistance, workability and the like. It has, however, poor impact resistance and heat stability. It further has extremely poor dimension stability due to high water absorption property. Water absorption also lowers its mechanical property remarkably. On the other hand, a polyphenylene ether resin is a thermoplastic resin excellent in various properties such as mechanical property, heat stability resistance, dimension resistance and the like. However, the polyphenylene ether resin itself has poor impact resistance and solvent resistance, and has poor workability due to its high melting viscosity. To supplement these drawbacks, it has been proposed to blend the both resins. However, the excellent mechanical properties of both resins are lost if they are simply blended. In order to solve this problem, various compatibilizing agents are added in blending a polyphenylene ether resin and a polyamide resin to improve dispersibility and to enhance mechanical property of the resulting resin composition (see, for example, JP-B-60-11966, JP-B-61-10494, JP-A-59-66452, JP-A-56-49753).

Polyphenylene ether/polyamide based resin composition thus obtained are being applied to electricity/electron field, automobile field as a material excellent in mechanical property, heat stability, solvent resistance, workability, dimension stability and moisture absorption property. Further, in order to improve impact resistance of these resin composition, there are disclosed resin compositions in which ethylene-propylene rubber, styrene-butadiene block copolymer, hydrogenated styrene-butadiene block copolymer, styrene-butadiene rubber and the like are used. However, even these improved compositions can not provide sufficient sound insulation property and damping property yet. To impart damping property to a polyamide resin, there is a proposal to add a filler such as mica and the like, however, sufficient impact strength is not obtained. To improve this impact strength, a rubber component such as an ethylene-propylene rubber endowed with a functional group is usually added, however, the resulting resin composition has remarkable low flowability and is not preferred.

SUMMARY OF THE INVENTION

The object of the present invention is to provide a thermoplastic resin composition comprising a polyphenylene ether and polyamide as a main component and having damping property, mechanical strength, impact resistance and heat stability resistance in well-balanced proportion and having excellent workability.

The present invention provides a thermoplastic resin composition comprising the following components (A) to (E):

(A): polyphenylene ether,
(B): polyamide,
(C): conjugated diene-alkenyl aromatic compound copolymer in which not less than 50% of the conjugated diene compound is polymerized by 1,2-bond or 3,4-bond and the tan δ peak temperature thereof is not less than −20° C.,
(D): compatibilizing agent, and
(E): inorganic filler,
in which the ratio by weight of (A)/(B) is from 1/99 to 80/20, the content of the component (C) is from 1 to 50 parts by weight based on 100 parts by weight of the total amount of the components (A) and (B), the content of the component (D) is sufficient amount to compatibilize the components (A) and (B), and the content of the component (E) is from 1 to 120 parts by weight based on 100 parts by weight of the total amount of the components (A) and (B).

DETAILED DESCRIPTION OF THE INVENTION

The component (A) of the present invention is a polyphenylene ether. It is preferably a polymer obtainable by oxidative polymerization of one or more of phenol compounds represented by the following formula (1) by oxygen or a oxygen-containing gas using an oxidative coupling catalyst:

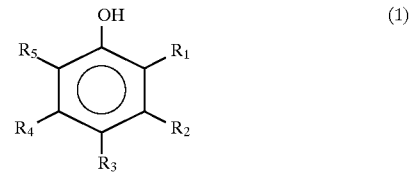

wherein $R_1$ to $R_5$, which are same or different, are one selected from the group consisting of hydrogen, halogen atom, hydrocarbon group and substituted hydrocarbon group, provided that at least one of $R_1$ to $R_5$ is hydrogen atom. Examples of $R_1$ to $R_5$ include hydrogen, chlorine, bromine, fluorine, iodine, methyl, ethyl, n-propyl, iso-propyl, pri-butyl, sec-butyl, t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the compound represented by the above-described formula (1) include phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6-di-phenylphenol, 2,6-diethylphenol, 2-methyl-6-ethylphenol, 2,3,5-trimethylphenol, 2,3,6-trimethylphenol, 2,4,6-trimethylphenol, 3-methyl-6-t-butylphenol, thymol and 2-methyl-6-allylphenol.

Further, as the component (A), there may be used a copolymer of the phenol compound represented by the above-described formula (1) and the other phenol compound, for example, a polyhydric hydroxy aromatic compound such as bisphenol-A, tetrabromobisphenol-A, resorcin, hydroquinone and novolak resin.

Preferable examples of the component (A) include a homopolymer of 2,6-dimethylphenol, homopolymer of 2,6-diphenylphenol, copolymer of major amount of 2,6-xylenol and minor amount of 3-methyl-6-t-butylphenol, and copolymer of major amount of 2,6-xylenol and minor amount of 2,3,6-trimethylphenol.

The component (B) of the present invention is one or more kinds of polyamide selected from crystalline aliphatic polyamides, aromatic polyamides and the like.

The crystalline polyamide used in the present invention can be obtained, for example, by reacting a saturated aliphatic dicarboxylic acid having 4 to 12 carbon atoms and an aliphatic diamine having 2 to 12 carbon atoms. In the reaction, a diamine can optionally be used so that the number of amine end groups exceeds the number of carboxyl end groups in the resulting polyamide. On the contrary, a dibasic acid can also be used so that excess acidic end groups are obtained in the resulting polyamide. Likewise, the crystalline polyamide can be preferably produced from acid forming derivatives and amine forming derivatives of said acid and amine, such as an ester, an acid chloride and an amine salt of said acid or amine. Representative examples of the aliphatic dicarboxylic acid used for production of this polyamide include adipic acid, pimelic acid, azelaic acid, suberic acid, sebacic acid and dodecane dioic acid. Representative examples of the aliphatic diamine includes hexamethylenediamine and octamethylenediamine. Further, the crystalline polyamide can be produced by self condensation of a lactam, a unit of ω-amino acid having 4 to 12 carbon atoms, a compound derived from an aliphatic dicarboxylic acid having 4 to 12 carbon atoms and an aliphatic diamine having 2 to 12 carbon atoms, or an equimolar salt of the above-mentioned various diamines with adipic acid, azelaic acid or sebacic acid. Examples of the lactam include ε-caprolactam and ω-laurolactam. Examples of the ω-amino acid include 11-aminoundecanoic acid and 12-aminododecanoic acid.

Examples of the polyamide include polyhexamethyleneadipamide (nylon 66), polyhexamethyleneazelamide (nylon 69), polyhexamethylenesebacamide (nylon 610), polyhexamethylenedodecanoamide (nylon 612), poly-bis-(p-aminocyclohexyl)methanedodecanoamide, polytetramethyleneadipamide (nylon 46), and polyamide obtained by ring-opening of lactam, such as polycaprolactam (nylon 6) and polylauryllactam. Further, there can be used a polyamide produced by polymerization of at least two kinds of amines or at least two kinds of acids. For example, a polyamide produced by polymerization of adipic acid and sebacic acid and hexamethylenediamine can be used. Further, a copolymer such as nylon 66/6, which are a copolymer of nylon 66 and nylon 6, and nylon 6/12 can also be used.

Among the crystalline polyamide, nylon 46, nylon 6, nylon 66, nylon 11, nylon 12 and the like are preferably used. More preferably, nylon 6, nylon 66 or a mixture of nylon 6 with nylon 66 in any ratio are used. Further, there can be used a polyamide containing major amount of amine end groups, a polyamide containing major amount of carboxyl end groups, a polyamide containing amine end groups and carboxyl end groups in well-balanced proportion, or a mixture of them in any ratio.

The aromatic polyamide used in the present invention may be a thermoplastic copolyamide which can be melt-polymerized and contains an aromatic component. The polyamide contains, as a main constituent, an aromatic amino acid and/or aromatic dicarboxylic acid, such as p-aminomethyl benzoic acid, p-aminoethyl benzoic acid, terephthalic acid and isophthalic acid. Examples of the aromatic polyamide include polyhexamethyleneisophthalamide (nylon 6I).

As the diamine, the other constituent of the aromatic polyamide, there can be used hexamethylenediamine, undecanemethylenediamine, dodecamethylenediamine, 2,2,4-trimethylhexamethylenediamine, 2,4,4-trimethylhexamethylenediamine, methoxylylenediamine, p-xylylenediamine, bis(p-aminocyclohexyl)methane, bis(p-aminocyclohexyl)propane, bis(3-methyl-4-aminocyclohexyl)methane, 1,3-bis(aminomethyl)cyclohexane, 1,4-bis(aminomethyl)cyclohexane and the like. Instead of the diamines, there can be used isocyanates such as diphenylmethane diisocyanate and tolylene diisocyanate.

The copolymerization component which is optionally used in the production of the aromatic polyamide is not particularly limited. Examples of the copolymerization component include a lactam, a unit of ω-amino acid having 4 to 12 carbon atoms, a compound derived from an aliphatic dicarboxylic acid having 4 to 12 carbon atoms and an aliphatic diamine having 2 to 12 carbon atoms, and an equimolar salt of the above-mentioned various diamines with adipic acid, azelaic acid and sebacic acid. Examples of the lactam include ε-caprolactam and ω-laurolactam. Examples of the ω-amino acid include 11-aminoundecanoic acid and 12-aminododecanoic acid.

Representative examples of the thermoplastic aromatic copolyamide include; a copolymerized polyamide of p-aminomethylbenzoic acid and ε-caprolactam (nylon AMBA/6); a polyamide containing, as a main component, 2,2,4-trimethylhexamethylenediamine terephthalate or 2,4,4-trimethylhexamethylenediamine terephthalate (nylon TMDT, TMDT/6I); a polyamide containing, as a main component, at least one selected from hexamethylenediamine isophthalate or hexamethylenediamine terephthalate and also containing, as a copolymerization component, at least one selected from bis(p-aminocyclohexyl)methane isophthalate, bis(p-aminocyclohexyl)methane terephthalate, bis(3-methyl-4-aminocyclohexyl)methane isophthalate, bis(3-methyl-4-aminocyclohexyl)methane terephthalate, bis(p-aminocyclohexyl)propane isophthalate or bis(p-aminocyclohexyl)propane terephthalate (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T); a polyamide containing, as a main component, at least one selected from hexamethylenediamine isophthalate or hexamethylenediamine terephthalate and containing, as a copolymerization component, at least one selected from ε-caprolactam, 12-aminododecanoic acid, hexamethylenediamine adipate, bis(p-aminocyclohexyl)methane adipate or bis(3-methyl-4-aminocyclohexyl)methane adipate (nylon 6I, 6I/6T, 6I/12, 6T/6, 6T/66, 6I/PACM 6, 6I/DMPACM 6); and a polyamide containing, as a main component, at least one selected from bis(p-aminocyclohexyl)methane isophthalate or bis(3-methyl-4-aminocyclohexyl)methane isophthalate and also containing, as a copolymerization component, at least one selected from hexamethylenediamine dodecanedioate or 12-aminododecanoic acid and the like (nylon PACM T/612, nylon DMPACM I/12).

Among these aromatic polyamides, a non-crystalline aromatic polyamide is preferably used.

In the thermoplastic resin composition of the present invention, the ratio by weight of (A): polyphenylene ether/(B): polyamide is from 1/99 to 80/20, preferably from 20/80 to 60/40. When the component (A) is too little, i.e. the component (B) is excess, stiffness at high temperature lowers. On the other hand, the component (A) is excess, i.e. the component (B) is too little, impact resistance and flowability remarkably decrease.

The component (C) of the present invention is a conjugated diene-alkenyl aromatic compound copolymer in which not less than 50% of the conjugated diene compound is polymerized by 1,2-bond or 3,4-bond and the tan δ peak temperature thereof is not less than −20° C. Examples of the conjugated diene include butadiene and isoprene. Examples of the alkenyl aromatic compound include styrene. The conjugated diene-alkenyl aromatic compound copolymer may be a block copolymer such as A-B, A-B-A and A-B-A-B type block copolymer wherein "A" and "B" represent a conjugated diene block and an alkenyl aromatic compound respectively, a random copolymer, or a partial random copolymer. Namely, examples of the conjugated diene-alkenyl aromatic compound copolymer include a block copolymer rubber comprising a styrene block (A) and butadiene block (B) or isoprene block (I), such as SB, SBS, SBSBS, SI, ISI, ISI and SISIS block copolymer wherein (and, hereinafter in this specification, when indicating the type of block copolymer) S, B and I represent a styrene block, butadiene block and isoprene block respectively.

A lot of production methods of the styrene based block copolymer rubber have been proposed. Typically, a copolymer rubber of an aromatic vinyl hydrocarbon (block A) and a conjugated diene hydrocarbon (block B) can be obtained by block copolymerization in an inert solvent using a lithium catalyst or Ziegler type catalyst according to the method described in JP-B-40-2798.

Not less than 50%, preferably not less than 65%, of the conjugated diene compound is polymerized by 1,2-bond or 3,4-bond. When less than 50% of the conjugated diene compound is polymerized by 1,2-bond or 3,4-bond, damping effect is insufficient, and especially when the conjugated diene compound is isoprene, decomposition due to heat is remarkable and impact strength lowers, therefore practical utility is poor. From the view of damping effect, the peak temperature of main variance of the tan δ (loss tangent) obtained by viscoelasticity measurement of the conjugated diene compound needs to be not less than −20° C. When the peak temperature is less than −20° C., sufficient damping property can not be obtained in ordinary temperature range. Isoprene gives higher damping effect as a conjugated diene component, therefore isoprene is preferred. That is, as the component (C), a styrene-isoprene block copolymer is preferred. In some cases, SIS type block copolymer and SBS type block copolymer can be used in combination.

When the conjugated diene component is isoprene, hydrogenation of the unsaturated bonds after polymerization is not preferred, since it causes undesirable decrease in damping effect thereof, although it may increase heat stability resistance.

The content of the alkenyl aromatic component is preferably from 5 to 60% by weight in the conjugated diene-alkenyl aromatic compound copolymer in order to obtain good impact resistance and damping effect. The more preferable content is from 10 to 40% by weight. When it is less than 5% by weight, the compatibility with polyphenylene ether is insufficient, and mechanical properties such as impact strength undesirably lower.

The content of the component (C) in the thermoplastic resin composition of the present invention is from 1 to 50 parts by weight, preferably from 5 to 30 parts by weight based on 100 parts by weight of the total amount of the components (A) and (B). When the content is too small, the improvement of impact resistance is not sufficient. On the other hand, when the content is excess, the thermoplastic resin composition is inferior in stiffness, impact resistance and coated film adhesion. In the present invention, as described below, an alkenyl aromatic resin may be used together with the components (A) to (D).

In the present invention, the component (D) is a compatibilizing agent. Examples thereof include the following (D1) to (D9):

(D1): epoxy compound having no ethylenic or actylenic unsaturated bond, (D2): compound having (i) at least one unsaturated group, that is carbon-carbon double bond or carbon-carbon triple bond, and (ii) at least one polar group in the same molecule at the same time, (D3): oxidized polyolefin wax (D4): silane compound having both (1) at least one silicon atom bonded to a carbon atom via crosslinkage of oxygen and (ii) at least one functional group selected from a carbon-carbon double bond, a carbon-carbon triple bond, an amino group and mercapto group, the aforesaid functional group not being bonded directly to a silicon atom, (D5): compound having (i) a group represented by the formula: OR, wherein R is hydrogen, or an alkyl, aryl, acyl or carbonyldioxy group, and (ii) at least two same or different functional groups selected from the group consisting of carboxylic acid, acid halide, acid anhydride, anhydrous acid halide, acid ester, acid amine, imide, imino, amino and salts thereof, together in the same molecule, (D6): a compound represented by the general formula ((I)—Z—(II)), wherein (I) is a group represented by the formula X—CO—, wherein X is F, Cl, B, I, OH, $OR_{12}$ or —O—CO—$R_{12}$, and $R_{12}$ is H, alkyl group or aryl group; (II) is a group selected from a carboxylic acid, acid anhydride group, acid amide group, imide group, carboxylate group, amino group or hydroxyl group, and the groups (I) and (II) are covalently bonded via Z which is a divalent hydrocarbon group, (D7): copolymer having a monomer unit of a vinyl aromatic compound as well as a monomer unit of α,β-unsaturated dicarboxylic acid, α,β-unsaturated dicarboxylic anhydride or an imido compound of α,β-unsaturated dicarboxylic acid, (D8): polyphenylene ether which is functionalized with at least one compatibilizing agent selected from the group consisting of (D1), (D2), (D4), (D5) and (D6), and (D9): composition obtained by melt-mixing of a small amount of a polyamide and a polyphenylene ether which is functionalized with at least one compatibilizing agent selected from the group consisting of (D1) to (D7).

The component (A): polyphenylene ether and the component (B): polyamide originally have poor affinity. Therefore, when they are simultaneously molten and mixed, polyphenylene ether particle in the resulting mixture is only dispersed with a particle size of not less than about 10 micron, and the resulting composition has extremely low mechanical properties. The component (D) is added to the composition of the present invention in order to solve this drawback.

Examples of the compatibilizing agent of the (D1) group include a condensate of epichlorohydrin with polyhydric phenol, such as bisphenol A, tetrabromobisphenol A and resorcin, and a condensate of epichlorohydrin with col, propylene glycol or polyethylene glycol.

The compatibilizing agent of the (D2) group used in the present invention is a compound having an unsaturated group, i.e. a carbon-carbon double bond or carbon-carbon triple bond, as well as a polar group, i.e. a functional group manifesting affinity and chemical reactivity with an amide bond existing in the polyamide resin and a carboxyl group and an amino group existing at chain end, in the same molecule. Examples of the functional group includes a carboxyl group; a group derived from carboxyl group, i.e. a group obtained by substitution of the hydrogen atom or hydroxyl group of a carboxyl group, such as salts, esters, acid amide, acid anhydride, imide, acid azide and acid halide of a carboxyl group; a functional group such as oxazoline and nitrile; epoxy group; amino group; hydroxyl group; and isocyanate group. Examples of the compatibilizing agent of the (D2) group include unsaturated carboxylic acids, unsaturated carboxylic acid derivatives, unsaturated epoxy compounds, unsaturated alcohols, unsaturated amines and unsaturated isocyanates. More specific examples of the compatibilizing agent of the (D2) group include maleic acid; maleic anhydride; fumaric acid; maleimide; maleic hydrazide; a reaction product of maleic anhydride and a diamine such as the compound having a structure represented by the following formula:

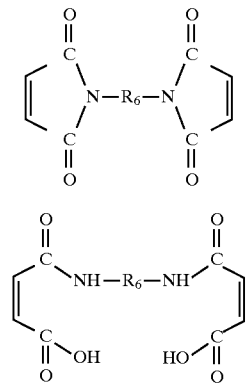

wherein $R_6$ indicates an aliphatic group and aromatic group; methylnadic anhydride; dichloromaleic anhydride; maleic amide; itaconic acid; itaconic anhydride; a natural fat and oil such as soy bean oil, tung oil, castor oil, linseed oil, hempseed oil, cottonseed oil, sesame oil, rapeseed oil, peanut oil, camellia oil, olive oil, coconut oil and sardine oil; epoxidized natural fat and oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexene, 2-methyl-2-pentenoic acid, 3-methyl-2-pentonoic acid, α-ethylcrotonic acid, 2·2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, icosenoic acid, docosenoic acid, erucic acid, tetracosenoic acid, mycolipenoic acid, 2·4-hexadienoic acid, diallylacetic acid, geraniumic acid, 2·4-decadienoic acid, 2·4-dodecadienoic acid, 9·12-hexadecadienoic acid, 9·12-octadecadienoic acid, hexadecatrienoic acid, icosadienoic acid, icosatrienoic acid, icosatetraenoic acid, ricinolic acid, eleostearic acid, oleic acid, icosapentaenoic acid, erucic acid, docosadienoic acid, docosatrienole acid, docosatetraenoic acid, docosapentaenoic acid, tetracosenoic acid, hexacosenoic acid, hexacodienoic acid, octacosenoic acid and tetracontenoic acid; esters of these unsaturated carboxylic acids; acid amide of these unsaturated carboxylic acids; acid anhydride of these unsaturated carboxylic acids; unsaturated alcohol such as allyl alcohol, crotyl alcohol, methylvinyl carbinol, allyl carbinol, methylpropenyl carbinol, 4-penten-1-ol, 10-undecen-1-ol, propargyl alcohol, 1·4-pentadien-3-ol, 1·4-hexadien-3-ol, 3·5-hexadien-2-ol, 2·4-hexadien-1-ol, an alcohol represented by the general formula: CnH2n—5OH, CnH2n—7OH or CnH2n—9OH, wherein n is a positive integer; an unsaturated alcohol such as 3-buten-1·2-diol, 2·5-dimethyl-3-hexene-2·5-diol, 1·5-hexadien-3·4-diol and 2·6-octadien-4·5-diol; an unsaturated amines obtained by substitution of the —OH group to —NH$_2$ group in such unsaturated alcohols; glycidyl (meth)acrylate; and allylglycidyl ether.

Specific examples of the compatibilizing agent of the (D2) group further include compounds obtained by addition of maleic anhydride or phenols to a polymer (such as those having an average molecular weight of not less than 10000) or oligomer (such as those having an average molecular weight from about 500 to 10000) of butadiene or isoprene; compounds obtained by introduction of an amino group, carboxyl group, hydroxyl group, epoxy group and the like into the said polymer or oligomer; and allyl isocyanate.

The compatibilizing agent of the (D2) group may have two or more unsaturated groups and/or two or more polar groups, these unsaturated groups or polar groups being same or different. The compatibilizing agent of the (D2) group can be used in combination of two or more kind of them.

Among the compatibilizing agent of the (D2) group, maleic anhydride, maleic acid, fumaric acid, itaconic anhydride, itaconic acid and glycidyl (meth)acrylate are preferably used, and maleic anhydride and fumaric acid are more preferably used.

The compatibilizing agent of the group (D3) used in the present invention is usually prepared by oxidation of a polyolefin wax in air or a suspension. Among the compatibilizing agent of the (D3) group, a polyethylene wax and the like are preferred.

The compatibilizing agent of the group (D4) used in the present invention is a silane compound having both (i) at least one silicon atom bonded to a carbon atom via crosslinkage of oxygen and (ii) at least one functional group selected from a carbon-carbon double bond, a carbon-carbon triple bond, an amino group and mercapto group, the aforesaid functional group not being bonded directly to a silicon atom. Examples of the compatibilizing agent of the group (D4) used in the present invention include γ-aminopropyltriethoxysilane and 2-(3-cyclohexyl) ethytrimethoxysilane.

The compatibilizing agent of the group (D5) used in the present invention is a compound having (i) a group represented by the formula: OR, wherein R is hydrogen, or an alkyl, aryl, acyl or carbonyldioxy group, and (ii) at least two same or different functional groups selected from the group consisting of carboxylic acid, acid halide, acid anhydride, anhydrous acid halide, acid ester, acid amine, imide, imino, amino and salts thereof, together in the same molecule. Examples of the compatibilizing agent of the group (D5) include an aliphatic polycarboxylic acid such as citric acid, malic acid and agaricinic acid, and derivatives thereof such as an ester compound, an amide compound, an anhydride, a hydrogenated substance and a salt of the aliphatic polycarboxylic acid. The details of these compounds are disclosed in JP-A-61-502195.

Preferably, the compatibilizing agent of the group (D5) is a saturated aliphatic polycarboxylic acid, an acid ester thereof or an acid amide thereof. The compatibilizing agent of the group (D5) is represented by the following general formula:

wherein $R_7$ is a linear or branched saturated aliphatic hydrocarbon having 2 to 20 carbon atoms, preferably 2 to 10 carbon atoms, $R_6$ is hydrogen, alkyl group, aryl group, acyl group or carbonyldioxy group, and particularly preferably $R_6$ is hydrogen, $R_9$ is hydrogen, alkyl group or aryl group having 1 to 20 carbon atoms, preferably 1 to 10 carbon atoms, $R_{10}$ and $R_{11}$ are hydrogen, alkyl group or aryl group having 1 to 10 carbon atoms, preferably 1 to 6 carbon atoms, more preferably 1 to 4 carbon atoms, p=1, q is an integer of 0 or more, r is an integer of 0 or more, provided that q+r is an integer of not less than 2, preferably 2 or 3, ($R_6O$) is situated at α-position or β-position of the carbonyl group, and 2 to 6 carbon atoms exist between the two carbonyl groups.

The compatibilizing agent of the group (D6) used in the present invention is a compound represented by the general formula ((I)—Z—(II)), wherein (I) represents one or more groups selected from groups represented by the formula X—CO—, wherein X is F, Cl, B, I, OH, $OR_{12}$ or —O—CO—$R_{12}$, and $R_{12}$ is H, alkyl group or aryl group; (II) represents one or more groups selected from a carboxylic acid, acid anhydride group, acid amide group, imide group, carboxylate group, amino group or hydroxyl group, and the groups (I) and (II) are covalently bonded via Z which is a divalent hydrocarbon group. Example of the compatibilizing agent of the group (D6) include chloroformyl succinic citric anhydride, chloroethanoyl succinic citric anhydride, trimellitic anhydride chloride, trimellitic anhydride acetic anhydride and terephthalic chloride.

However, the compatibilizing agent (D) of the present invention is not limited to those as exemplified above. Any compound which is used for improving compatibility between a polyphenylene ether and polyamide may be used. These compatibilizing agents may be used alone or in combination of two or more kind thereof. The amount of the compatibilizing agent (D) to be blended is from 0.01 to 30 parts by weight based on 100 parts by weight of the total amount of the polyphenylene ether resin (A) and the polyamide resin (B). When the amount exceeds 30 parts by weight, the heat stability resistance lowers and the strength remarkably decreases due to decomposition or the like. The preferable amount to be blended is from 0.05 parts by weight to 25 parts by weight.

Among the compatibilizing agent (D) as exemplified above, maleic anhydride, maleic acid, fumaric acid, itaconic acid, citric acid and malic acid are particularly preferred.

In blending of the compatibilizing agent, a radical initiator may be used together.

The component (E) of the present invention is an inorganic filler. Examples of the component (E) include calcium carbonate, magnesium carbonate, aluminium hydroxide, magnesium hydroxide, zinc oxide, titanium oxide, magnesium oxide, aluminium silicate, magnesium silicate, calcium silicate, silicic acid, hydrous calcium silicate, hydrous aluminium silicate, mineral fiber, sonotlite, potassium titanate whisker, magnesium oxy sulfate, glass balloon, glass fiber, glass beads, inorganic fiber such as carbon fiber and stainless fiber, talc, mica, kaurin and carbon black. These may be used in combination of two or more kind thereof. Among the filler (E), an inorganic filler having aspect ratio of not less than 5, such as talc, kaurin and mica, is preferred. An plate form inorganic filler having aspect ratio of not less than 5 is more preferred and paticulary, mica is preferred. The amount of the component (E) to be blended is from 1 to 120 parts by weight based on 100 parts by weight of the total amount of the components (A) and (B). When the component (E) is too little, damping property is poor. On the other hand, when the component (E) is excess, flowability remarkably decreases. Further, for improving the stiffness, there can be used an organic filler such as an aramide fiber and the like.

To the composition of the present invention, in addition to the components (A) to (E), an alkenyl aromatic resin may also be used. The alkenyl aromatic resin preferably has an elasticity modulus at room temperature of not less than 10000 kg/cm². Examples of the alkenyl aromatic resin include polymer and copolymer of styrene, α-styrene and p-methylstyrene. More specific examples thereof include polystyrene, rubber reinforced polystyrene, poly-α-methylstyrene, poly-p-methylstyrene, styrene-acrylonitrile copolymer, and a compound obtained by grafting a styrene based polymer on a polyphenylene ether.

The content of the alkenyl aromatic resin in the thermoplastic resin composition of the present invention is not more than 60% by weight, preferably from 1 to 30% by weight. When the content is excess, impact resistance and heat stability resistance of the thermoplastic resin composition may decrease.

To obtain the thermoplastic resin composition of the present invention, the components (A) to (E), and optionally the alkenyl aromatic resin, filler and the like, may be blended and melt-mixed according to a known method. The order of the blending and the melt-mixing is not restricted. For example, various combinations of each component may be separately mixed respectively before the all combinations are blended and mixed. Alternatively, not less than one component may be fed one after another along a cylinder having multiple feeding portions in one extruder.

To the thermoplastic resin composition of the present invention may added conventional additives such as flame retardant, plasticizer, antioxidant and weathering stabilizer. As the additives, those used for a polyphenylene ether or nylon are suitably used.

The thermoplastic resin composition of the present invention has good heat resistance, damping property, impact resistance and heat stability. It is also excellent in workability. Therefore, the resin composition can be applied most suitably to acoustic parts and the like by utilizing the excellent features thereof. Also, the resin composition can be used for an outer plate material of an automobile, building material and the like.

As described above, there can be provided a thermoplastic resin composition which has damping property, mechanical strength, impact resistance and heat stability resistance in well-balance proportion and has excellent workability by adding a specific conjugated diene-aromatic compound polymer to a thermoplastic resin composition containing a polyamide and polyphenylene ether as a main component.

The following Examples further illustrate the present invention in detail but are not to be construed to limit the scope thereof.

The components (A), (C) and (D) of which formulations are shown in Tables 1 and 2 were thrown into the first feed port of TEM50 biaxial mixer manufactured by Toshiba Kikai K.K., and they were molten and mixed. Then, the remaining components to be blended shown in Tables 1 and 2 were thrown into the second feed port between the first feed port and a dice, and the melt-mixing was conducted again. The molten resin extruded via the dice was cooled in a water vessel and, then, was pelletized by a strand cutter.

Thus obtained pellet was dried in vacume for 4 hours at 130° C. Then, using the dried pellet, each test piece was molded by an injection molding machine IS 220 EN manufactured by Toshiba Kikai K.K. at the conditions of a cylinder temperature of 270° C., an injection pressure of 1200 kg/cm² and a mold temperature of 80° C. Thus obtained test pieces were examined and the mechanical properties thereof were measured according to the following methods.

(1) Melt Index (MI)

A pellet of each resin composition was vacuum dried for 4 hours at 140° C. Then, the melt index was measured with a load of 2.16 kg at a temperature of 280° C.

(2) Impact Resistance (Izod Impact Test)

After a test piece of 3.2 mmt for Izod test was molded by an injection molding machine, notch was formed on the rest piece. Then, the impact test was conducted in an atmosphere of 23° C. according to ASTM D256.

(3) Bending Modulus

A test piece of 3.2 mmt for bending test was molded by an injection molding machine. Then, the bending test was conducted in an atmosphere of 23° C. according to ASTM D790.

(4) Heat Resistance (Heat Deformation Test: H.D.T.)

A test piece of 6.4 mmt for heat deformation test was molded by an injection molding machine. Then, the heat deformation test was conducted according to ASTM D648.

(5) Evaluation of Damping Property

Damping property was evaluated by absolute value of tan δ (loss tangent) in viscoelasticity measurement of the obtained composition. After pellet of the obtained composition was vacuum dried for 5 hours at 140° C., a press sheet having thickness of 1 mm was produced at 290° C. After the sheet was cut into a dimension of 5 mm×5 mm, damping property thereof was measured by FT rheospectorer DVE-4 manufactured by Rheology K.K. at the conditions of 23° C., 100 Hz and 999 Hz.

(6) Layer Peeling

Layer peeling of the injection-molded article was visually observed.

All Examples which suffice the conditions of the present invention reveal sufficient results in every evaluation items. On the other hand, the molded articles of Comparative Examples not containing the component (C), which is an essential component of the present invention, are inferior in damping property or layer peeling occurs in the molded articles. Therefore, they have poor practical utility.

TABLE 1

|   |   | Example | | | | | |
|---|---|---|---|---|---|---|---|
|   |   | 1 | 2 | 3 | 4 | 5 | 6 |
| Formulation *1 | | | | | | | |
| (A) | Kind | PPE-B | PPE-B | PPE-B | PPE-B | PPE-A | PPE-B |
|   | Amount | 20 | 20 | 20 | 20 | 30 | 20 |
| (B) | Kind | PA-B | PA-B | PA-A | PA-B | PA-A | PA-B |
|   | Amount | 53 | 53 | 53 | 55 | 45 | 53 |
| (C) | Kind | VS-1 | VS-1 | VS-1 | VS-1 | VS-1 | VS-3 |
|   | Amount | 7 | 7 | 7 | 4.5 | 10 | 7 |
|   | Kind | — | — | TR2000 | — | — | — |
|   | Amount | — | — | 4.5 | — | — | — |
| (D) | Kind | MAH | MAH | MAH | MAH | MAH | MAH |
|   | Amount | 0.2 | 0.2 | 0.2 | 0.3 | 0.2 | 0.2 |
| (E) | Kind | 200D | 300W | TALC | 300W | GF | 200D |
|   | Amount | 20 | 20 | 20 | 15 | 15 | 20 |
| Znst | | 0.2 | 0.2 | 0.2 | 0.2 | — | 0.2 |
| WH255 | | 7 | 7 | 7 | 3 | — | 7 |

TABLE 2

|   |   | Comparative example | | | | |
|---|---|---|---|---|---|---|
|   |   | 1 | 2 | 3 | 4 | 5 |
| Formulation *1 | | | | | | |
| (A) | Kind | PPE-A | PPE-A | PPE-B | PPE-B | PPE-B |
|   | Amount | 30 | 30 | 30 | 30 | 20 |
| (B) | Kind | PA-A | PA-A | PA-A | PA-A | PA-B |
|   | Amount | 55 | 55 | 55 | 55 | 53 |
| (C) | Kind | TR1107P | D1111 | — | TR2825 | TR2825 |

TABLE 2-continued

|   |   | Comparative example | | | | |
|---|---|---|---|---|---|---|
|   |   | 1 | 2 | 3 | 4 | 5 |
|   | Amount | 15 | 15 | — | 15 | 7 |
| (D) | Kind | MAH | MAH | MAH | MAH | MAH |
|   | Amount | 0.3 | 0.3 | 0.3 | 0.3 | 0.2 |
| (E) | Kind | — | — | — | — | 200D |
|   | Amount | — | — | — | — | 20 |
| Znst | | — | — | — | — | 0.2 |
| WH255 | | — | — | — | — | 7 |

TABLE 3

|   |   | Comparative example | | | | |
|---|---|---|---|---|---|---|
|   |   | 6 | 7 | 8 | 9 | 10 |
| Formulation *1 | | | | | | |
| (A) | Kind | PPE-B | PPE-B | PPE-B | PPE-B | PPE-B |
|   | Amount | 20 | 20 | 20 | 20 | 20 |
| (B) | Kind | PA-B | PA-B | PA-B | PA-B | PA-B |
|   | Amount | 53 | 53 | 53 | 53 | 53 |
| (C) | Kind | G1657 | 1910P | 1320P | HSV-3 | TR1107P |
|   | Amount | 7 | 7 | 7 | 7 | 7 |
| (D) | Kind | MAH | MAH | MAH | MAH | MAH |
|   | Amount | 0.2 | 0.2 | 0.2 | 0.2 | 0.2 |
| (E) | Kind | 200D | 200D | 200D | 200D | 200D |
|   | Amount | 20 | 20 | 20 | 20 | 20 |
| Znst | | 0.2 | 0.2 | 0.2 | 0.2 | 0.2 |
| WH255 | | 7 | 7 | 7 | 7 | 7 |

TABLE 4

|   |   | Comparative example | | |
|---|---|---|---|---|
|   |   | 11 | 12 | 13 |
| Formulation *1 | | | | |
| (A) | Kind | PPE-B | PPE-B | PPE-A |
|   | Amount | 20 | 20 | 30 |
| (B) | Kind | PA-B | PA-B | PA-A |
|   | Amount | 53 | 53 | 45 |
| (C) | Kind | D1111 | — | TR2000 |
|   | Amount | 7 | — | 10 |
| (D) | Kind | MAH | MAH | MAH |
|   | Amount | 0.2 | 0.2 | 0.2 |
| (E) | Kind | 200D | 200D | GF |
|   | Amount | 20 | 20 | 15 |
| Znst | | 0.2 | 0.2 | — |
| WH255 | | 7 | 7 | — |

TABLE 5

|   | Example | | | | | |
|---|---|---|---|---|---|---|
|   | 1 | 2 | 3 | 4 | 5 | 6 |
| Evaluation | | | | | | |
| MI | 71 | 69 | 50 | 60 | 5 | 73 |
| Impact resistance | 2.6 | 2.7 | 2.8 | 2.5 | 8.4 | 2.7 |
| Bending modulus | 46600 | 47000 | 35000 | 43000 | 42400 | 45600 |
| Heat resistance | 190 | 189 | 188 | 187 | 193 | 189 |
| K.D.T | | | | | | |

TABLE 5-continued

|  | Example | | | | | |
|---|---|---|---|---|---|---|
|  | 1 | 2 | 3 | 4 | 5 | 6 |
| Tan δ (× 10$^{-2}$) | | | | | | |
| 100 Hz | 3.4 | 3.6 | 3.0 | 2.3 | 2.5 | 2.9 |
| 999 Hz | 5.8 | 6.0 | 5.1 | 5.3 | 5.2 | 5.3 |
| Layer peeling | No | No | No | No | No | No |

TABLE 6

|  | Comparative example | | | | |
|---|---|---|---|---|---|
|  | 1 | 2 | 3 | 4 | 5 |
| Evaluation | | | | | |
| MI | 1.9 | 1.8 | 40 | 20 | 55 |
| Impact resistance | 7.8 | 6.6 | 1.2 | 15 | 2.6 |
| Bonding modulus | 19300 | 21800 | 27000 | 20200 | 44700 |
| Heat resistance | 188 | 186 | 188 | 173 | 118 |
| Tan δ (× 10$^{-2}$) | | | | | |
| 100 Hz | 1.6 | 1.7 | 1.9 | 2.2 | 1.5 |
| 999 Hz | 5.1 | 4.6 | 3.9 | 3.8 | 4.3 |
| Layer peeling | Yes | Yes | No | No | No |

TABLE 7

|  | Comparative example | | | | |
|---|---|---|---|---|---|
|  | 6 | 7 | 8 | 9 | 10 |
| Evaluation | | | | | |
| MI | 87 | 82 | 86 | 91 | 84 |
| Impact resistance | 2.9 | 2.6 | 2.6 | 2.7 | 2.8 |
| Bonding modulus | 45500 | 46000 | 44800 | 47000 | 41100 |
| Heat resistance H.D.T | 191 | 192 | 190 | 195 | 187 |
| Tan δ (× 10$^{-2}$) | | | | | |
| 100 Hz | 1.5 | 1.4 | 1.6 | 1.9 | 1.6 |
| 999 Hz | 4.2 | 4.3 | 4.1 | 5.1 | 4.1 |
| Layer peeling | No | No | No | Yes | Yes |

TABLE 8

|  | Comparative example | | |
|---|---|---|---|
|  | 11 | 12 | 13 |
| Evaluation | | | |
| MI | 79 | 90 | 4 |
| Impact resistance | 2.6 | 2.6 | 8.3 |
| Bonding modulus | 43300 | 49200 | 43400 |
| Heat resistance H.D.T | 189 | 191 | 191 |

TABLE 8-continued

|  | Comparative example | | |
|---|---|---|---|
|  | 11 | 12 | 13 |
| Tan δ (× 10$^{-2}$) | | | |
| 100 Hz | 2.1 | 1.5 | 1.8 |
| 999 Hz | 4.5 | 4.1 | 4.1 |
| Layer peeling | Yes | No | No |

*1 Numerical value for the formulation in Table 1–4 is parts by weight.

*2 Meaning of marks used in the Tables are as follows:

Component (A)

PPE-A: a chloroform solution (concentration: 0.5 g/dl) of a polyphenylene ether which was obtained by homopolymerization of 2,6-dimethylphenol and has the inherent viscosity at 30° C. of 0.46.

PPE-B: a chloroform solution (concentration: 0.5 g/dl) of a polyphenylene ether which was obtained by homopolymerization of 2,6-dimethylphenol and has the inherent viscosity at 30° C. of 0.30.

Component (B)

PA-A: nylon 6 having a number average molecular weight of 17500

PA-B: nylon 6 having a number average molecular weight of 12000

Component (C)

VS-1: styrene-isoprene copolymer manufactured by Kuraray Co., Ltd., trade name HYBRAR (registered trade mark), bonded styrene content 20 wt %, 1,2- or 3,4-bond content of isoprene 70%, glass transition temperature 8° C.

VS-3: styrene-isoprene copolymer manufactured by Kuraray Co., Ltd., trade name HYBRAR (registered trade mark), bonded styrene content 20 wt %, 1,2- or 3,4-bond content of isoprene 55%, glass transition temperature −17° C.

HVS-3: hydrogenated styrene-isoprene copolymer manufactured by Kuraray Co., Ltd., trade name HYBRAR (registered trade mark), bonded styrene content 20 wt %, 1,2- or 3,4-bond content of isoprene 55%, glass transition temperature −19° C.

D1111: styrene-isoprene copolymer manufactured by Shell Co., Ltd., trade name Kraton (registered trade mark), bonded styrene content 21 wt %.

TR1107P: styrene-isoprene copolymer manufactured by Shell Co., Ltd., trade name Cariflex (registered trade mark), bonded styrene content 14 wt %

TR2787: styrene-butadiene-styrene block copolymer (alkenyl aromatic block copolymer) manufactured by Japan Synthetic Rubber Co., Ltd., trade name TR2787, styrene/butadiene ratio (w/w)=30/70

TR2825: styrene-butadiene-styrene block copolymer (alkenyl aromatic block copolymer) manufactured by Japan Synthetic Rubber Co., Ltd., trade name TR2825, styrene/butadiene ratio (w/w)=25/75

TR2000: styrene-butadiene-styrene block copolymer (alkenyl aromatic block copolymer) manufactured by Japan Synthetic Rubber Co., Ltd., trade name TR2000, styrene/butadiene ratio (w/w)=40/60

G1657: hydrogenated styrene-butadiene-styrene block copolymer (hydrogenated alkenyl aromatic block copolymer) manufactured by Shell Chemical Co., Ltd., trade name Kraton G1657

1910P: hydrogenated styrene-butadiene copolymer manufactured by Japan Synthetic Rubber Co., Ltd., trade name DYNARON (registered trade mark), bonded styrene content 30 wt %, hydrogen addition ratio 98 to 99%

1320P: hydrogenated styrene-butadiene copolymer manufactured by Japan Synthetic Rubber Co., Ltd., trade name DYNARON (registered trade mark), bonded styrene content 10 wt %, hydrogen addition ratio 98 to 99%

Component (D) Compatibilizing Agent

MAB: maleic anhydride

CA: citric acid (E) Filler mica 200D: manufactured by Kuraray Co., Ltd., weight average particle size 90 μm, weight average aspect ratio 50 mica 300W: manufactured by Kuraray Co., Ltd., weight average particle size 30 μm, weight average aspect ratio 40

GF: Chopped Strand RES03TP64, manufactured by Nippon Sheet Glass Co., Ltd.

(Other Component)

Znst: zinc stearate

WH255: Lightamide WH-255, manufactured by Kyoeisha Fat and Oil Chemical Industry Co., Ltd.

TALC: Micronwhite 5000S, manufactured by Hayashi Kasei Co., Ltd.

What is claimed is:

1. A thermoplastic resin composition comprising the following components (A) to (E):

(A): polyphenylene ether;

(B): polyamide, (C): conjugated diene-alkenyl aromatic compound copolymer in which not less than 50% of the conjugated diene compound is polymerized by 1,2-bond or 3,4-bond and the tan δ peak temperature thereof is not less than −20° C., (D): compatibilizing agent, and (E): inorganic filler, in which the ratio by weight of (A)/(B) is from 1/99 to 80/20, the content of the component (C) is from 1 to 50 parts by weight based on 100 parts by weight of the total amount of the components (A) and (B), the content of the component (D) is a sufficient amount to compatibilize the components (A) and (B), and the content of the component (E) is from 1 to 120 parts by weight based on 100 parts by weight of the total amount of the components (A) and (B).

2. A thermoplastic resin composition according to claim 1, wherein the component (D) is at least one member selected from the group consisting of components (D1), (D2), (D3), (D4), (D4), (D5), (D6), (D7), (D8) and (D9), wherein (D1) is an epoxy compound having no ethylenic or acetylenic unsaturated bond, (D2) is a compound having (i) at least one unsaturated group, that is carbon-carbon double bond or carbon-carbon triple bond, and (ii) at least one polar group in the same molecule at the same time, (D3) is an oxidized polyolefin wax, (D4) is a silane compound having both (i) at least one silicon atom bonded to a carbon atom via crosslinkage of oxygen and (ii) at least one functional group selected from the group consisting of a carbon-carbon double bond, a carbon-carbon triple bond, an amino group and mercapto group, the aforesaid functional group not being bonded directly to a silicon atom, (D5) is a compound having (i) a group represented by the formula: OR, wherein R is hydrogen, an alkyl, aryl, acyl or carbonyldioxy group, and (ii) at least two same or different functional groups selected from the group consisting of carboxylic acid, acid halide, acid anhydride, anhydrous acid halide, acid ester, acid amine, imide, imino, amino and salts thereof, together in the same molecule, (D6) is a compound represented by the general formula ((I)—Z—(II)), wherein (I) is a group represented by the formula X—CO—, wherein X is F, Cl, B, I, OH, $OR_{12}$, or O—CO—$R_{12}$, and $R_{12}$ is H, alkyl group or aryl group; (II) is a group selected from the group consisting of a carboxylic acid, acid anhydride group, acid amide group, imide group, carboxylate group, amino group and hydroxyl group, and the groups (I) and (II) are covalently bonded via Z which is a divalent hydrocarbon group, (D7) is a copolymer having a monomer unit of a vinyl aromatic compound as well as a monomer unit of α,β-unsaturated dicarboxylic anhydride or an imide compound of α,β-unsaturated dicarboxylic acid, (D8) is a polyphenylene ether which is functionalized with at least one compatibilizing agent selected from the group consisting of (D1), (D2), (D4), (D5) and (D6), and (D9) is a composition obtained by melt-mixing of a small amount of a polyamide and a polyphenylene ether which is functionalized with at least one compatibilizing agent selected from the group consisting of (D1), (D2), (D3), (D4), (D5), (D6) and (D7).

3. A thermoplastic resin composition according to claim 1, wherein the component (D) is at least one selected from the group consisting of maleic anhydride, maleic acid, fumaric acid, itaconic acid, citric acid and malic acid.

4. A thermoplastic resin composition according to claim 1, wherein the component (C) is a styrene-isoprene block copolymer.

5. A thermoplastic resin composition according to claim 4, wherein the styrene content of the component (C) is 5 to 65% by weight.

6. A thermoplastic resin composition according to claim 4, wherein the styrene content of the component (C) is 10 to 40% by weight.

7. A thermoplastic resin composition according to claim 4, wherein the component (C) is a conjugated diene-alkenyl aromatic compound copolymer in which not less than 65% of the conjugated diene compound is polymerized by 1,2-bond or 3,4-bond and the tan δ peak temperature thereof is not less than −20° C.

8. A thermoplastic resin composition according to claim 1, wherein the component (E) is a plate form inorganic filler having a aspect ratio of not less than 5.

9. A thermoplastic resin composition according to claim 8, wherein the component (E) is mice.

10. A thermoplastic resin composition according to claim 1, which comprises an alkenyl aromatic resin in addition to the components (A) to (E).

11. The thermoplastic resin composition of claim 10, wherein the alkenyl aromatic resin has an elasticity modulus at room temperature of not less than 10000 kg/cm$^2$.

12. The thermoplastic resin composition of claim 10, wherein the alkenyl aromatic resin is present in the thermoplastic resin composition in an amount of not more than 60% by weight.

* * * * *

UNITED STATES PATENT AND TRADEMARK OFFICE
CERTIFICATE OF CORRECTION

PATENT NO. : 5,886,094
DATED : March 23, 1999
INVENTOR(S) : Takashi Sanada, et al.

It is certified that error appears in the above-identified patent and that said Letters Patent is hereby corrected as shown below:

Add the following new claims:

13. A thermoplastic resin composition according to claim 1, wherein the component (D) is a compatibilizing agent selected from the group consisting of maleic anhydride, fumaric acid and citric acid.

14. A thermoplastic resin composition according to claim 13, wherein the component (E) comprises mica.

15. A thermoplastic resin composition according to claim 13, wherein the component (C) is a styrene-isoprene block copolymer.

16. A thermoplastic resin composition according to claim 1, wherein the component (D) is a compatibilizing agent selected from the group consisting of maleic anhydride, fumaric acid and citric acid; wherein the component (E) comprises mica; wherein the component (C) is a styrene-isoprene block copolymer.

Signed and Sealed this

Eighth Day of June, 1999

*Attest:*

Q. TODD DICKINSON

*Attesting Officer*     *Acting Commissioner of Patents and Trademarks*